United States Patent
Dawson et al.

(10) Patent No.: US 10,552,318 B2
(45) Date of Patent: *Feb. 4, 2020

(54) WORKING SET ADJUSTMENT IN A MANAGED ENVIRONMENT

(71) Applicant: International Business Machines Corporation, Armonk, NY (US)

(72) Inventors: Michael H. Dawson, Ottawa (CA); Charles R. Gracie, Kanata (CA); Graeme Johnson, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/859,783

(22) Filed: Jan. 2, 2018

(65) Prior Publication Data

US 2018/0121350 A1   May 3, 2018

Related U.S. Application Data

(63) Continuation of application No. 14/667,719, filed on Mar. 25, 2015, now Pat. No. 9,898,405.

(30) Foreign Application Priority Data

Apr. 10, 2014  (CA) ..................... 2848683

(51) Int. Cl.
*G06F 17/30* (2006.01)
*G06F 12/02* (2006.01)

(52) U.S. Cl.
CPC .... *G06F 12/0269* (2013.01); *G06F 2212/702* (2013.01); *G06F 2212/7205* (2013.01)

(58) Field of Classification Search
CPC ........... G06F 12/0269; G06F 2212/702; G06F 2212/7205

(Continued)

(56) References Cited

U.S. PATENT DOCUMENTS

| 6,125,434 A | 9/2000 | Willard et al. |
| 7,490,117 B2 | 2/2009 | Subramoney et al. |

(Continued)

FOREIGN PATENT DOCUMENTS

CN   103838633 A   6/2014

OTHER PUBLICATIONS

Pending application No. 2848683, entitled "Working Set Adjustment in a Managed Environment", Filed on Apr. 10, 2014.

(Continued)

*Primary Examiner* — Isaac M Woo
(74) *Attorney, Agent, or Firm* — Kristofer L. Haggerty

(57) ABSTRACT

An illustrative embodiment of a computer-implemented method for working set adjustment receives a request to use less heap memory than an original maximum forming a new maximum, and determines whether a garbage collection will move objects in response to the request. Responsive to a determination the garbage collection will move objects, add a first callback triggered by initiation of the garbage collection and invoking a handler for the first callback notifying a memory manager to free objects allocated by balloon. The first callback completes and the garbage collection starts. A handler for a second callback is invoked which notifies the memory manager to allocate balloon objects and frees backing memory to an operating system, the balloon objects consuming an amount of memory space equal to a remaining portion of memory necessary to return to the operating system. Completion of the second call back allows the garbage collection to proceed as usual.

17 Claims, 10 Drawing Sheets

(58) Field of Classification Search
USPC .................................................. 707/600–899
See application file for complete search history.

(56) References Cited

U.S. PATENT DOCUMENTS

| | | |
|---|---|---|
| 7,792,879 B2 | 9/2010 | Qi et al. |
| 7,912,877 B2 | 3/2011 | Shankar et al. |
| 2004/0133759 A1 | 7/2004 | Sekiguchi |
| 2010/0031270 A1 | 2/2010 | Wu et al. |
| 2011/0320682 A1 | 12/2011 | McDougall et al. |
| 2013/0325912 A1* | 12/2013 | Corrie ................ G06F 12/0253 707/813 |
| 2014/0143516 A1 | 5/2014 | Dawson et al. |
| 2014/0208055 A1 | 7/2014 | Dawson et al. |
| 2015/0293842 A1 | 10/2015 | Dawson et al. |

OTHER PUBLICATIONS

Yang et al., "CRAMM: Virtual Memory Support for Garbage-Collected Applications, OSDI '06 Proceedings of the 7th symposium on Operating systems design and implementation", pp. 103-116, 2006.

Hines et al., "Applications Know Best: Performance-Driven Memory Overcommit With Ginkgo", 2011 Third IEEE International Conference on Cloud Computing Technology and Science, pp. 130-137.

Alonso et al., "An Advisor for Flexible Working Sets", Department of Computer Science, Princeton University, 1990 ACM, pp. 153-162.

Zhang et al., "Program-level Adaptive Memory Management", ISMM 2006, Jun. 10-11, 2006, Ottawa, Ontario, Canada, pp. 174-183.

IBM, List of IBM Patents or Patent Applications Treated as Related, Appendix P, dated Jan. 5, 2018, 2 pages.

* cited by examiner

WORKING SET ADJUSTMENT IN A MANAGED ENVIRONMENT

BACKGROUND

The present invention generally relates to managed environments in a data processing system and more specifically to optimization of working set adjustment in a managed environment of a virtual machine of the data processing system.

Heavily virtualized computing environments, for example, cloud computing, are designed to realize cost savings by maximizing density of applications enabled to run per unit of hardware. Maximizing density of applications improves utilization rates of the hardware and energy efficiency accordingly by eliminating idle machines.

In view of a significant portion of typical workloads being written using the Java® programming language specification the managed environment of a Java virtual machine (JVM) should recognize and exploit these virtualized environments. Java and all Java-based trademarks and logos are trademarks of Oracle Corporation, and/or its affiliates, in the United States, other countries or both. Maximization of application density typically requires the JVM to reduce a respective resource footprint, adapt to changing resource allocation, share more across JVM instances, and leverage hypervisor-specific functionality including fast guest-to-guest network fabric.

Java Virtual Machines have traditionally operated in what may be described as a "greedy" manner. The JVM often reserves resources up to a maximum allowed, even when the JVM does not necessarily need to do so. Further, once the JVM has used a resource, the resource is typically held assuming a subsequent later use. While this behavior is optimal while resources are fully available as is common in conventional environments, the practice however is not helpful with virtualized environments where over-provisioning is commonly used based on knowledge not all guests need maximum resource allocation concurrently.

An example of the current described behavior is a use of heap memory (memory used to store objects). Heap memory often grows, even when unused space exists on the heap, and then only slowly returns memory to the operating system, if at all. Over a period of time operating system memory allocated for an object heap in the JVM accordingly tends towards a maximum, as allowed when the JVM was started, although the JVM may only need the maximum for previously defined intervals (for example, between 9-10 users traditionally log into a particular application). Because returning memory to the operating system (for example when scanning, compacting) incurs a computational cost the JVM typically prefers to 'hold' extra memory rather than incurring a cleanup cost. Therefore, common practice advises customers never to simply avoid memory over-provisioning for Java applications, which accordingly reduces the value of virtualization.

Although there are few features to adjust heap sizes automatically using hints from hypervisors, memory pressure or other dynamic attributes in current commercial JVM implementations, published articles disclose these kinds of techniques. Techniques typically use a form of "balloon" to steal memory from a heap and return the memory to an operating system (or hypervisor) or adjust a maximum memory used by a collector to a value set using external factors. Each of the techniques has advantages and disadvantages described using a notation of Dn.

In one example using a balloon object, a required interaction with a JVM is minimized and does not require garbage collection (GC) activity to free memory. The disadvantage (D1) of this approach is the GC continues to manage the memory consumed by the balloon objects in the heap as normal objects, which accordingly adds overhead. In another example, when the GC moves objects (for example, during a compact operation) the GC may move the objects, also including the balloon object thus forcing the objects back into memory. The balloon object could detect this occurrence and free the memory but with additional overhead expended and memory pressure increased while the objects are moved (D2).

In another example in which a dynamically modified target for a heap is used an advantage is obtained in minimizing objects that must be handled by the GC. Minimizing objects that must be handled enables the GC to manage the objects optimally based on actual objects used by the application and a target available memory rather than being misled by special balloon objects. However a disadvantage (D3) of this example is the objects typically require relocation before memory can be freed and accordingly returned to the operating system. The GC activity required to move the objects therefore typically has an associated premium in the form of computation and paging overhead.

SUMMARY

According to an embodiment, a computer-implemented method for working set adjustment receives a request to use less heap memory than an original maximum forming a new maximum, determines whether a garbage collection will move objects in response to the request. Responsive to a determination the garbage collection will move objects, add a first callback triggered by initiation of the garbage collection and invoking a handler for the first callback notifying a memory manager to free objects allocated by balloon. The first callback completes and the garbage collection starts. A handler for a second callback is invoked which notifies the memory manager to allocate balloon objects and frees backing memory to an operating system. Completion of the second call back allows the garbage collection to proceed as usual.

According to another embodiment, a computer program product for working set adjustment comprises a computer readable storage device containing computer executable program code stored thereon. The computer executable program code comprises computer executable program code for receiving a request to use less heap memory than an original maximum forming a new maximum; computer executable program code for determining whether a garbage collection will move objects in response to the request; computer executable program code responsive to a determination the garbage collection will move objects, adding a first callback triggered by initiation of the garbage collection that will move objects; computer executable program code for invoking a handler for the first callback notifying a memory manager to free objects allocated by balloon; computer executable program code for completing the first callback and starting the garbage collection; computer executable program code for invoking a handler for a second callback which notifies the memory manager to allocate balloon objects and frees backing memory to an operating system; computer executable program code for completing the second call back allowing the garbage collection to proceed as usual.

According to another embodiment, an apparatus for working set adjustment comprises a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric. The processor unit executes the computer executable program code to direct the apparatus to receive a request to use less heap memory than an original maximum forming a new maximum; determine whether a garbage collection will move objects in response to the request; responsive to a determination the garbage collection will move objects, add a first callback triggered by initiation of the garbage collection that will move objects; invoke a handler for the first callback notifying a memory manager to free objects allocated by balloon; complete the first callback and starting the garbage collection; invoke a handler for a second callback which notifies the memory manager to allocate balloon objects and frees backing memory to an operating system; and complete the second call back allowing the garbage collection to proceed as usual.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
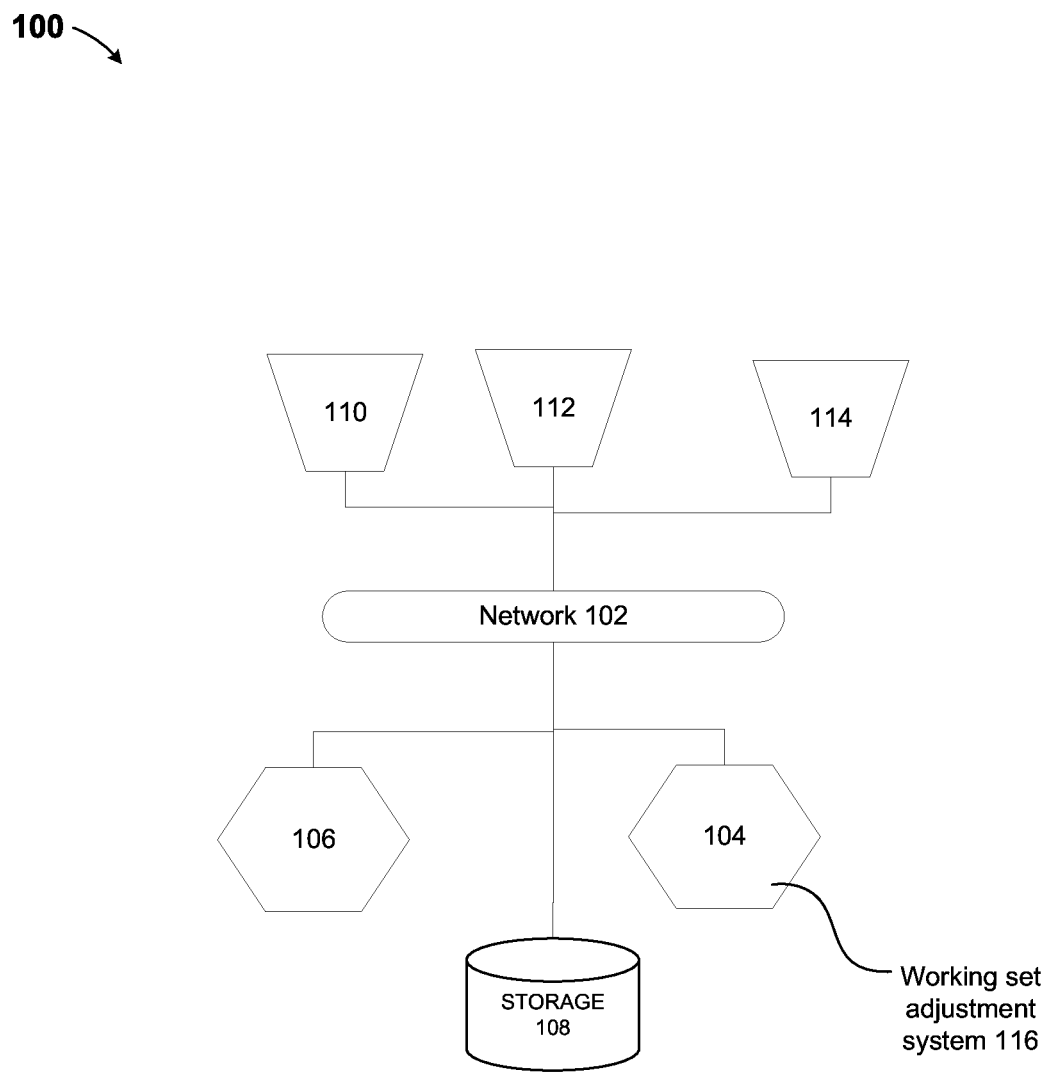
FIG. 1 is a block diagram of an exemplary network data processing system operable including a working set adjustment system for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage devices may be utilized. A computer-readable data storage device may be, for example, but not limited to, an electronic, magnetic, optical, or semiconductor system, apparatus, or device, or any suitable combination of the foregoing, but does not encompass propagation media. More specific examples (a non-exhaustive list) of the computer-readable data storage devices would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing, but does not encompass propagation media. In the context of this document, a computer-readable data storage device may be any tangible device that can store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor in one or more processors of a general purpose computer, special purpose computer, or other programmable data processing apparatus to produce a machine, such that the instructions, which execute via the processor of the one or more processors of the computer or other programmable data processing apparatus, create means for implementing the functions/acts specified in the flowchart and/or block diagram block or blocks.

These computer program instructions may also be stored in a computer readable storage device that can direct a computer or other programmable data processing apparatus to function in a particular manner, such that the instructions stored in the computer readable storage device produce an article of manufacture including instructions which implement the function/act, when executed by the processor of the one or more processors of the computer specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the processor of the one or more processors of the computer or other programmable apparatus provide processes for implementing the functions/acts specified in the flowchart and/or block diagram block or blocks.

Figure 2:
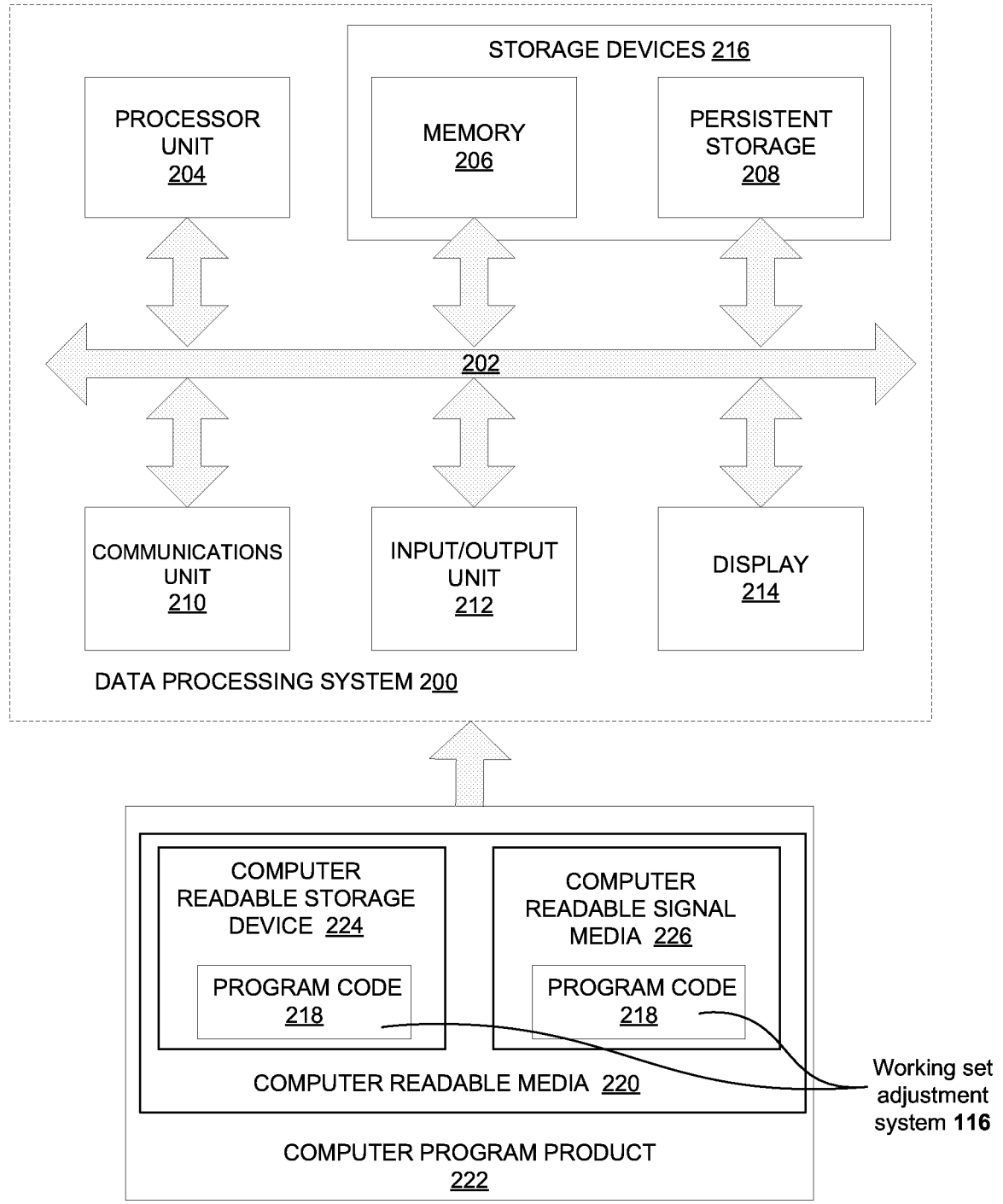
FIG. 2 is a block diagram of an exemplary data processing system including a working set adjustment system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable storage device 224. In some instances, computer readable media 220 may not be removable.

Alternatively, program code 218 may be transferred to data processing system 200 from computer readable media 220 through a communications link to communications unit 210 and/or through a connection to input/output unit 212 using computer readable signal media 226. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for working set adjustment is presented. Processor unit 204 receives a request to use less heap memory than an original maximum forming a new maximum, determines whether a garbage collection will move objects in response to the request. Responsive to a determination the garbage collection will move objects, processor 204 adds a first callback triggered by initiation of the garbage collection and invokes a handler for the first callback notifying a memory manager to free objects allocated by balloon. The first callback completes and the garbage collection starts.

A handler for a second callback is invoked by processor 204 notifying the memory manager to allocate balloon objects and frees backing memory to an operating system. Completion of the second call back allows the garbage collection, using processor 204, to proceed as usual.

One illustrative embodiment comprises a computer-implemented method for adjustment of a working set of a virtual machine. The computer-implemented process of the illustrative embodiment receives a request by the virtual machine to reduce memory usage to a new target level of memory usage and further determines whether to free memory without invoking a garbage collection.

Responsive to a determination to free memory without invoking a garbage collection, a garbage collector frees any memory in a heap, without having to start a garbage collection, up to an amount necessary to meet the new target level of memory usage; sets a new dynamic target for a maximum heap size to a value of the new target level of memory usage requested; allocates one or more dummy objects in the heap in an amount required to reduce a non-balloon memory used by the heap to the new target level of memory usage requested and returns memory for the dummy objects to an operating system.

Responsive to a determination to free memory by invoking a garbage collection, wherein the garbage collection causes objects to be moved, the garbage collector signals logic responsible for handling memory pressure to perform the steps of: indicating a type of garbage collection that will occur; selectively free balloon objects which can be moved; complete collection activity, upon which the garbage collector signals the logic responsible for handling memory pressure to create new balloon objects to enable a return of memory to the operating system.

Responsive to a determination to free memory by invoking a garbage collection, wherein the garbage collection will not cause objects to be moved, the garbage collector signals logic responsible for handling memory pressure to perform the steps of release the memory to the operating system by the garbage collector; signal the logic responsible for handling memory pressure with the amount of memory released by the garbage collector; and free the balloon objects in the amount of the memory already released to the operating system.

Figure 3:
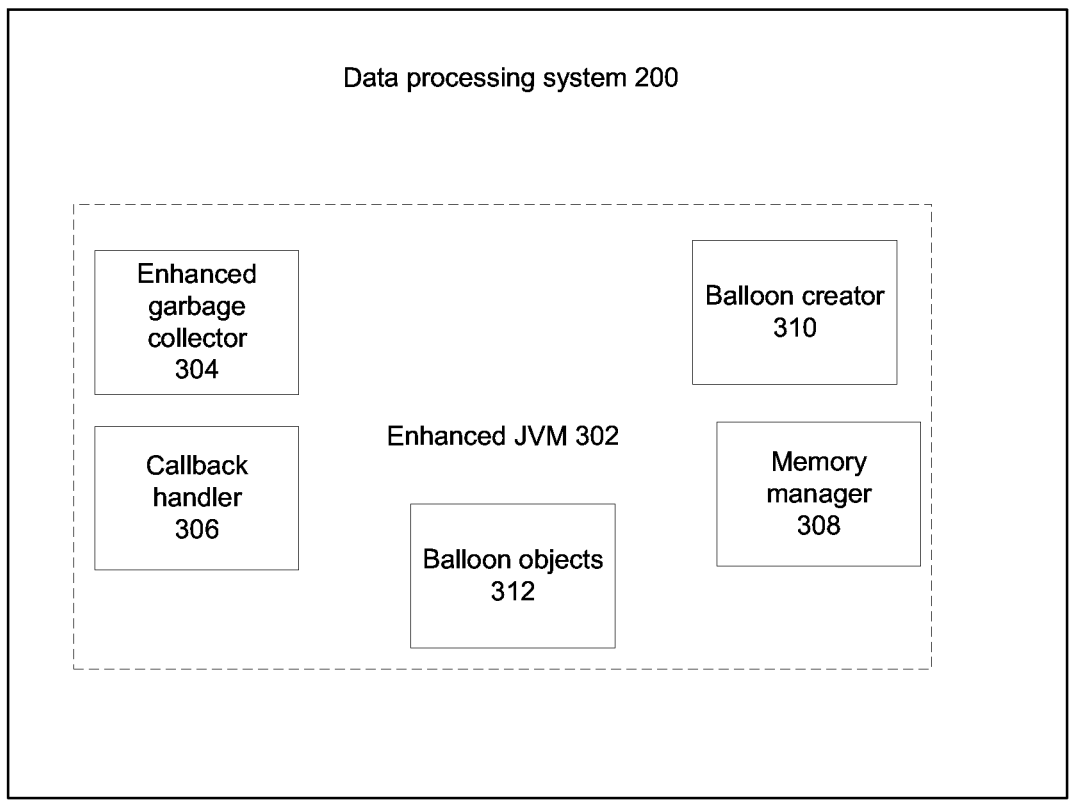
FIG. 3 is a block diagram representation of a working set adjustment system operable for various embodiments of the disclosure.

With reference to FIG. 3 a block diagram representation of a working set adjustment system operable for various embodiments of the disclosure is presented. Working set adjustment system 300 is an example of an embodiment of the disclosed method. In the example used, a set comprises one or more elements. The components described are not limited to an implementation of the illustrative embodiment but may be arranged in other combinations as necessary for a specific implementation without loss of functionality. For example the components as illustrated in working set system 300 of FIG. 3 may be implemented as a monolithic structure defined as enhanced JVM 302.

Enhanced JVM 302 includes a capability to receive an indication the JVM should attempt to use less memory. The usage reduction may be based on operating system memory pressure, information from a hypervisor or any other mechanism. The information or notification is not part of the instant disclosure but is a pre-requisite to use of the disclosed method. Enhanced JVM 302 further provides a capability to dynamically set a new target maximum heap size.

Enhanced JVM 302 is comprised of a number of components including enhanced garbage collector 304, callback handler 306, memory manager 308, balloon creator 310 and balloon objects 312.

Enhanced garbage collector 304 provides a capability to respond to signals from callback handler 306 or memory manager 308. Responsive to the signals comprising information on a current status of the memory of a heap being managed, enhanced garbage collector 304 can dynamically adjust behavior to return memory to an operating system and avoid a scheduled garbage collection.

Callback handler 306 provides a mechanism in which a callback can be issued and received enabling status of the memory of a managed heap to be communicated to enhanced garbage collector 304.

Memory manager 308 provides logic responsible for handling memory pressure caused by application allocation and de-allocation of heap memory.

Balloon creator 310 provides a capability to create or allocate one or more dummy objects in the heap being managed in an amount required to reduce a non-balloon memory used by the heap. Balloon objects 312 are the dummy objects created by balloon creator 310 used to better manage heap memory allocation. Balloon objects 312 occupy space but disappear dynamically and are never moved. Balloon objects 312 represent a space maintaining technique.

When enhanced JVM 302 is requested to use less memory, in one instance, enhanced garbage collector 304 frees any memory in the heap without having to start a garbage collection up to an amount necessary to meet a new target. For example when there is free contiguous memory at the end of the heap, or regions known to be empty. In another instance enhanced JVM 302 sets a new dynamic target for a maximum heap size to a value requested. In another instance enhanced JVM 302 allocates dummy objects (balloon objects 312) using balloon creator 310 in the heap in an amount required to reduce non-balloon memory used by the heap to the level requested, and returns the memory for these objects back to the operating system. For example using a function of madvise (MADV_DONT-NEED) when available on a platform of data processing system 200.

When the creation of the dummy objects triggers a garbage collection such that objects will be moved, the creation of balloon objects 312 is aborted because using the new target set the enhanced logic of the working set adjustment system assumes control. Optionally the disclosed method includes directing balloon creator 310 to allocate balloon objects 312 in a particular manner. For example when using a generational collector selection of an allocation by balloon creator 310 to allocate balloon objects 312 in one of new space or old space is enabled.

This results in free regions of the heap consumed by dummy objects whose backing memory has been returned to the operating system and thereby avoiding problem D3. Note that when "balloon" objects are created they are established for efficient scanning required in later stages of the disclosed technique.

The enhanced logic is used when an allocation in the application subsequently causes a garbage collection and the particular garbage collection causes objects to be moved. The enhanced logic includes receiving signals from enhanced garbage collector 304 by logic responsible for handling memory pressure of memory manager 308 indicating what type of garbage collection will occur.

Balloon objects 312 which could be moved are selectively freed. For example, when in a generational collector the collection that will take place is only in new space, only those objects that were allocated from new space will be freed). The collection by enhanced garbage collector 304 is allowed to complete. Enhanced garbage collector 304 signals the logic responsible for handling memory pressure of memory manager 308. When necessary, new balloon objects 312 are created to return memory back to the operating system. This may be necessary because although objects in a particular space are freed the dynamic target may not affect the particular space in the same ratio as the balloon objects that were allocated the particular space.

By removing the balloon objects at the garbage collection point the disclosed method typically avoids overhead cited as D1 previously because balloon objects disappear dynamically and D2 previously because balloon objects are never moved.

When objects are freed or an allocation by the applications causes a garbage collection that will not move objects the enhanced garbage collector 304 can release memory back to the operating system, signal the logic of memory manager 308 responsible for handling memory pressure with the amount of memory released and free balloon objects 312 in the amount of the memory already released back to the operating system.

An alternative of using either previous solution of the balloon technique or the dynamically adjusted maximum heap has disadvantages. When using the previous balloon technique the garbage collection continues to manage memory consumed by the balloon objects in the heap, which incurs additional overhead, and the garbage collection may move objects allocated from the balloon thus forcing the objects back into memory. This movement can result in spikes in memory pressure as well as additional overhead in the garbage collection.

When using the previous dynamic maximum heap target, once the target is set, additional garbage collection activity (for example compacting) is typically necessary to have the heap in a condition in which memory can be freed. This activity introduces additional overhead and might also limit how fast memory can be returned to the operating system.

In contrast when using an embodiment of the working set adjustment system 300 of the disclosure the memory is returned immediately to the operating system without requiring any garbage collection activity. Because as normal garbage collection activity occurs driven by application memory usage, an embodiment of the working set adjustment system 300 avoids copying balloon allocated objects and moves towards a target state with no balloon objects where the target is managed by the garbage collection without having to introduce any artificial garbage collection activity. The result is the embodiment of the working set adjustment system 300 quickly addresses memory pressure while at the same time minimizing required additional CPU overhead achieving a better memory/CPU trade off than typically achieve with previously available techniques.

Figure 4:
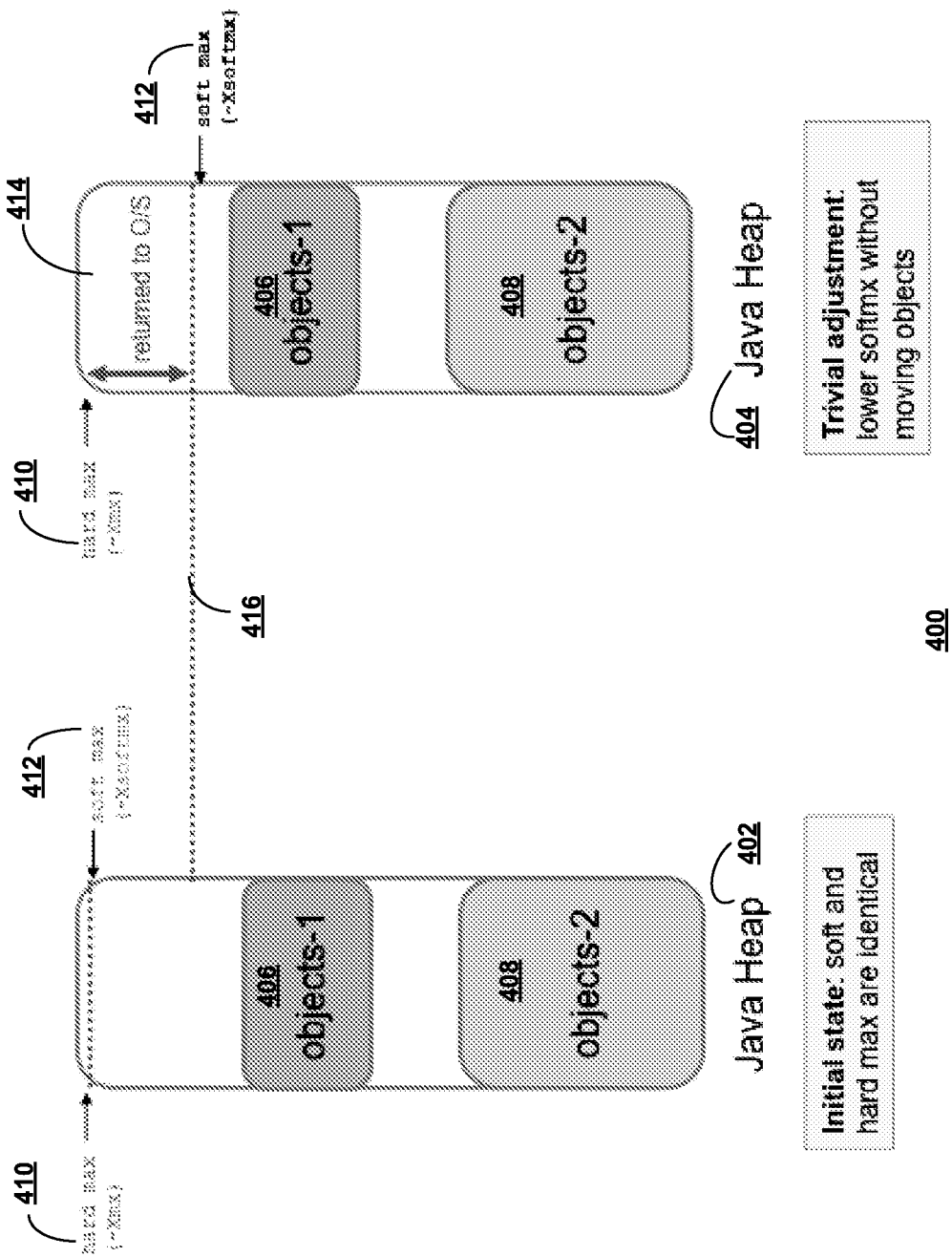
FIG. 4 is a block diagram of data structures in a garbage collection using the system of FIG. 3 in accordance with an embodiment of the disclosure.

With reference to FIG. 4 a block diagram of data structures in a garbage collection using the system of FIG. 3 in accordance with an embodiment of the disclosure is presented. Example 400 presents a view in which a first part of the disclosed method using less heap memory than an original maximum using is presented. Example 400 depicts handling an initial request to use less heap memory than the original maximum.

In the example, Java heap 402 is in an initial state with hard max 410 and soft max 412. Java heap 402 further contains objects-1 406 and objects-2 408 allocated within. Hard max 410 and a soft max 412 as set in the initial state are at the same setting or value. A technique of the disclosed method now sets a new dynamic maximum heap size. Java heap 404 is in an adjusted state with hard max 410 as before but with soft max 412 at a new or adjusted setting. Java heap 402 further contains objects-1 406 and objects-2 408 allocated within as before.

In some cases the garbage collections may be enabled to easily satisfy a request for space without rearranging the heap as depicted. Notice soft max line 416 is lowered from an first setting of soft max 412 in the initial state of Java heap 402 (same as hard max 410) to a new setting of soft max 412 in Java heap 404 without moving either objects of objects-1 406 and objects-2 408.

Memory between objects-1 406 and hard max 410 (and soft max 412) must have been used at some point in a run. Otherwise this memory would have been reserved, but not committed. In example 400 region 414, between hard max 410 and soft max 412, of Java heap 404 is simply returned to the operating system as unused and therefore freed memory.

Figure 5:
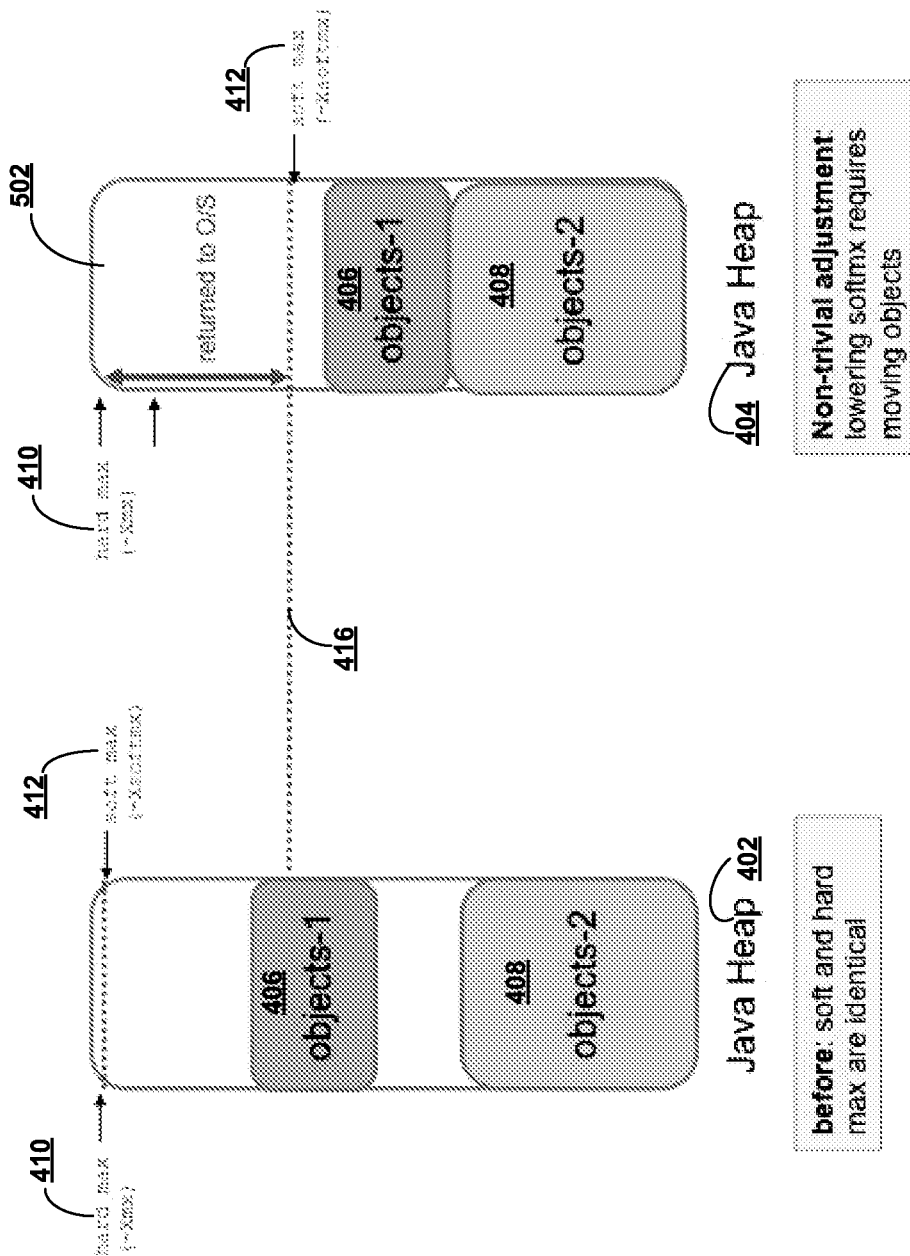
FIG. 5 is a block diagram of data structures in a garbage collection which may move objects using the system of FIG. 3 in accordance with an embodiment of the disclosure.

With reference to FIG. 5 a block diagram of data structures in a garbage collection, which may move objects using the system of FIG. 3 in accordance with an embodiment of the disclosure is presented. Example 500 depicts processing of an initial request to use less heap memory than an original maximum.

In the example, Java heap 402 is in an initial state with hard max 410 and soft max 412. Java heap 402 further contains objects-1 406 and objects-2 408 allocated within. Hard max 410 and a soft max 412 as set in the initial state are at the same setting or value. A technique of the disclosed method now sets a new dynamic maximum heap size. Java heap 402 also contains objects-1 406 and objects-2 408 allocated within as before. Java heap 404 is in an adjusted state representation of Java heap 402, with hard max 410 as before but with soft max 412 at a new or adjusted setting, which accordingly requires movement of objects-1 406 to free needed memory.

In example 500 the garbage collection cannot easily satisfy a request for memory without rearranging the heap from an initial state to an adjusted state as depicted. Notice soft max line 416 is lowered from soft max 412 in the initial state of Java heap 402 (same level as hard max 410) to a new setting of soft max 412 in Java heap 404. The lowering of soft max 412 from the initial state setting accordingly requires a movement of one or more objects of objects-1 406 and objects-2 408. Objects-2 408 as in Java heap 404 of the example cannot be readily moved; therefore objects-1 406 is an identified move candidate.

In example 500, region 502, between hard max 410 and soft max 412, of Java heap 404 is now returned to the operating system. As shown in the example, it is equally likely that objects will need to be rearranged to lower the setting of soft max 412. As depicted in the example, soft max line 416 cannot be lowered without first moving objects-1 406 at a cost of additional processor cycles and memory bandwidth. Gaps between objects, as between objects-1 406 and objects-2 408 of Java heap 402 are expected and a natural side effect of object allocation and free operations through a run. The size and location of these gaps however is not predictable.

Figure 6:
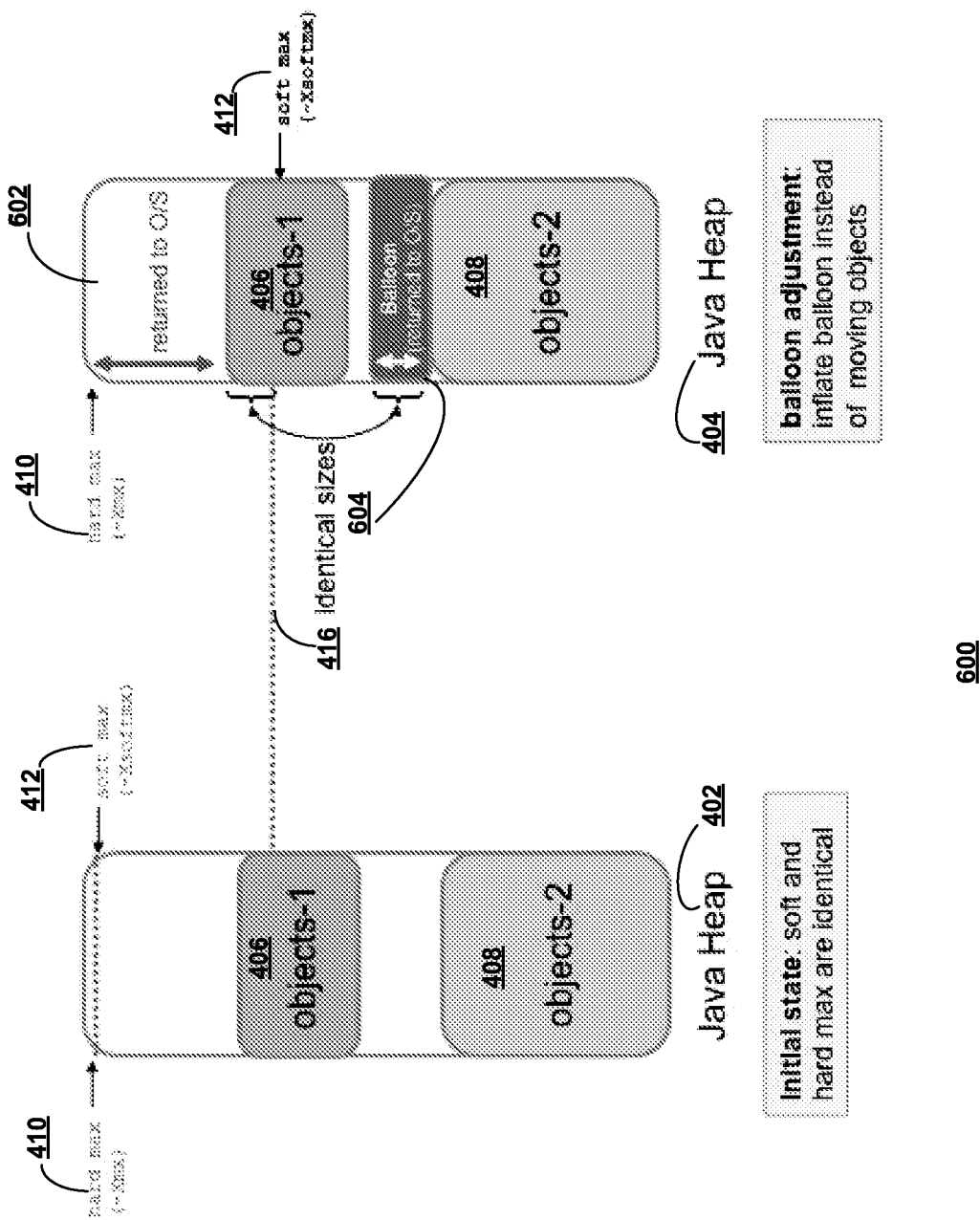
FIG. 6 is a block diagram of data structures in a garbage collection which does not move objects to free memory using the system of FIG. 3 in accordance with an embodiment of the disclosure.

With reference to FIG. 6 a block diagram of data structures in a garbage collection, which does not move objects to free memory using the system of FIG. 3 in accordance with an embodiment of the disclosure is presented. Example 600 is an example of using a balloon object to avoid moving objects in accordance with the disclosed method.

Example 600 depicts handling an initial request to use less heap memory than the original maximum. In the example Java heap 402 is in an initial state with hard max 410 and soft max 412 set at the same level. Java heap 402 further contains objects-1 406 and objects-2 408 allocated within. Hard max 410 and a soft max 412 as set in the initial state are at the same setting or value. A technique of the disclosed method now sets a new dynamic maximum heap size. Java heap 404 is in an adjusted state with hard max 410 as before but with soft max 412 at a new or adjusted setting, which may require movement of objects-1 406 to free needed memory.

In example 600 the garbage collections cannot easily satisfy a request for memory without rearranging the heap. Notice soft max line 416 is lowered from a previous setting of soft max 412 (same as initial setting of hard max 410) in the initial state of Java heap 402 to a new setting of soft max 412 in Java heap 404. The lowering of soft max 412 from the initial state setting appears to require a movement of either objects of objects-1 406 and objects-2 408. Objects-2 408, as in Java heap 404 of the example, cannot be readily moved; therefore objects-1 406 is identified as a move candidate.

In example 600, region 602, between hard max 410 and soft max 412, of Java heap 404 is now returned to the operating system. As shown in the example, it is equally likely that objects will need to be rearranged to lower the setting of soft max 412. As depicted in the example, soft max line 416 cannot be lowered without first moving objects-1 406 at a cost of additional processor cycles and memory bandwidth. Gaps between objects, as between objects-1 406 and objects-2 408 of Java heap 402 are expected and a natural side effect of object allocation and object free operations through normal processing cycles. The size and location of these gaps however is not predictable.

Rather than initiating a garbage collection activity requiring reclaiming and returning memory an embodiment of the disclosed method allocates balloon object 604 to consume an amount of space equal to a remaining portion of memory necessary to return to the operating system. For example, a technique of madvise(MADV_DONTNEED) used on a platform comprising Linux® or disclaim( ) on an system using AIX® might be used as an aid to return most of the memory for the balloon objects back to the respective operating system. The resulting heap shape, after reduction of the balloon objects, has the same amount of free space in the heap.

A contiguous area 602 at the top of Java heap 404 and the contents of in-heap balloon 604 have been returned to the operating system without needing to rearrange the heap. The combination of allocated space of contiguous area 602 and in-heap balloon 604 is equal to a desired amount of returned space. A size of in-heap balloon 604 is accordingly allocated equal to a size of (soft max 412–contiguous area 602).

At this point in the process an embodiment of the disclosed method has returned approximately the same amount of memory to the operating system as a conventional garbage collection but has not incurred the resource overhead needed to move objects. In actual use the heap shape may be much more complicated, with allocated ranges and free ranges being interleaved. Use of the disclosed technique would achieve the same result.

As in the example, when there is not enough free memory in the heap to accommodate the new target max, garbage collection may be triggered to allocate the balloon objects. Because a new target maximum is set, when garbage collection activity results in memory being returned to an operating system, the garbage collection will allocate the balloon objects and a size of the balloon objects created is based on the current size of the memory used by the heap. The balloon object size allocation would therefore be determined by checking a size of physical memory used for a heap. Balloon allocation size is determined, in a number of iterations, using a calculation expressed as (size of physical memory for heap–total balloon size) relative to a value of new max. For each next balloon object allocated a size of physical memory used for the heap is checked again. When the expression (size of physical memory for heap–total balloon size) is equal to or less than new max, the operation stops.

In each loop of the iteration the total balloon size is incremented, causing a value of (size of physical memory for heap–total balloon size) to be reduced. A determination is also made in each of the iterations as to whether the value represented by (size of physical memory for heap−total balloon size) becomes smaller than the value set for new max.

Given a new target is set, the space available for use in the heap is (size of physical memory for heap−total balloon size). When the calculated value is greater than the target new max then another balloon object needs to be allocated to reduce the available value towards the target value. When the calculation of (size of physical memory for heap−total balloon size) is equal to or less than the target value of new max the allocation operations stop. However when the allocation operations exhaust free memory the allocation operations also stop.

It is expected that either the required balloon size is successfully allocated or more aggressive steps are needed to get to the new target size including a transition to handling of garbage collections, which may move objects. Once the balloon inflation is successful the application continues to run as before and objects can further be allocated and freed within the area occupied by objects-1 406 and objects-2 408 and the free area (unmarked area indicating unallocated heap storage). Using the disclosed balloon inflation adjustment, inflation and deflation (or elimination) of the balloon is used to absorb and release heap memory rather than moving of objects in the heap.

Figure 7:
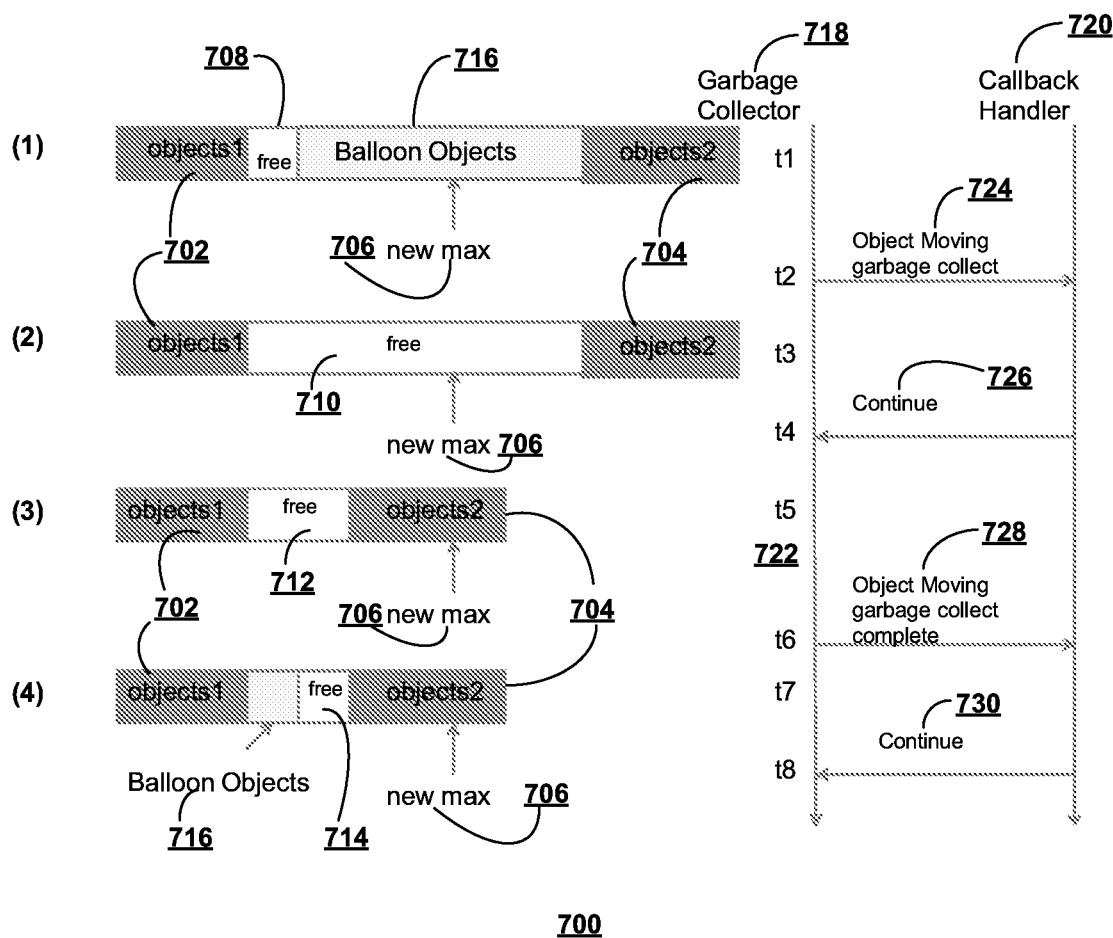
FIG. 7 is a block diagram of garbage collection process which may move objects to free memory using a callback of the system of FIG. 3 in accordance with an embodiment of the disclosure.

With reference to FIG. 7 a block diagram of data structures in a garbage collection using a callback of the system of FIG. 3 in accordance with an embodiment of the disclosure is presented. Process 700 is an example of a set of operations over a period of time representative of an object moving garbage collection in an embodiment of the disclosed method.

(1) When garbage collector 718 is triggered which might move objects 702 and 704 in process 700 to increase free space 708 to achieve new max 706, the moving or copying balloon objects 716 is to be avoided when possible. Avoidance is because moving or copying balloon objects 716 is a needless consumption of processor cycles and memory bandwidth. Garbage collector 718 triggers a first callback and invokes a callback handler 720 when a garbage collection that might cause objects to move is triggered in process 700. The callback optionally includes a type of garbage collection. Garbage collector 718 waits until the first callback is completed before proceeding with the garbage collection to avoid unnecessary object movement.

(2) Callback handler 720 processes the first callback notifying a memory manager to free objects allocated by the balloon objects when the first callback was triggered during process 700 to provide an increase in allocation of free space 708 to free space 710.

(3) Process 700 invokes the callback handler for a second callback triggered by garbage collector 718 when a garbage collection cycle that might move objects is completed resulting in a portion of free space being returned to an operating system and leaving free space 712.

(4) Callback handler 720 processes the second callback notifying the memory manager to create balloon objects, such as balloon objects 716, required when the second callback is received. Free space is now further reduced due to creation of balloon objects 716, and is now shown as free space 714.

In an alternate view of the just described process 700, consider the timeline 722 in which at t1 application allocations cause garbage collector 718 to trigger a garbage collection that might move objects. At t2 garbage collector 718 invokes callback handler 720 to inform the logic managing memory pressure of object moving garbage collect 724.

At t3 the logic managing memory pressure frees balloon objects. At t4 the logic managing memory pressure completes the callback processing with callback handler 720 and garbage collector 718 continues 726 the garbage collection.

At t5 objects have been moved and the garbage collection is complete. However garbage collector 718 may not have achieved the new maximum specified. At t6 garbage collector 718 invokes callback handler 720 again to inform the logic managing memory pressure that garbage collection is complete 728.

At t7 the logic managing memory pressure, allocates balloon objects and frees the memory backing the balloon objects to the operating system such that physical memory for heap−total balloon size=new max. At t8 the logic managing memory pressure, returns from callback handler 720 and garbage collector 718 continues 730 as usual.

Figure 8:
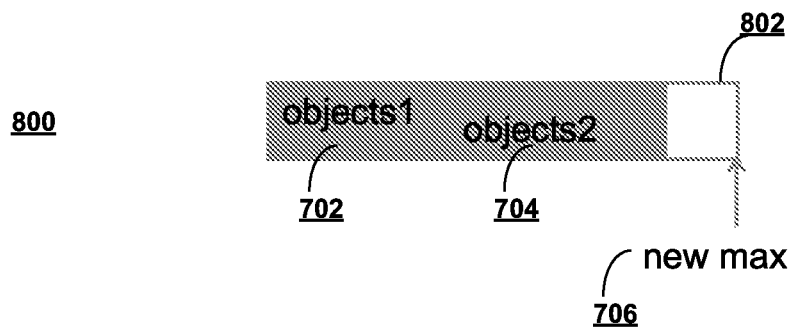
FIG. 8 is a block diagram of a data structures after a garbage collection garbage collection which moves objects to free memory in accordance with an embodiment of the disclosure.

With reference to FIG. 8 a block diagram of data structure after a garbage collection, which moves objects to free memory in accordance with an embodiment of the disclosure, is presented. Data structure 800 is an example of an in memory representation of heap allocations.

In an ideal case when garbage collector 718 of FIG. 7 moves objects the objects are moved such that a memory data structure is directly allocated in a desired shape rather than in the form of data structure 800. In data structure 800 objects-1 702 and objects-2 704 have been moved together with no free space or balloon space separating the two objects. New max 706 is at a rightmost end of data structure 800 and free space 802 lies between objects-2 704 and new max 706.

Figure 9:
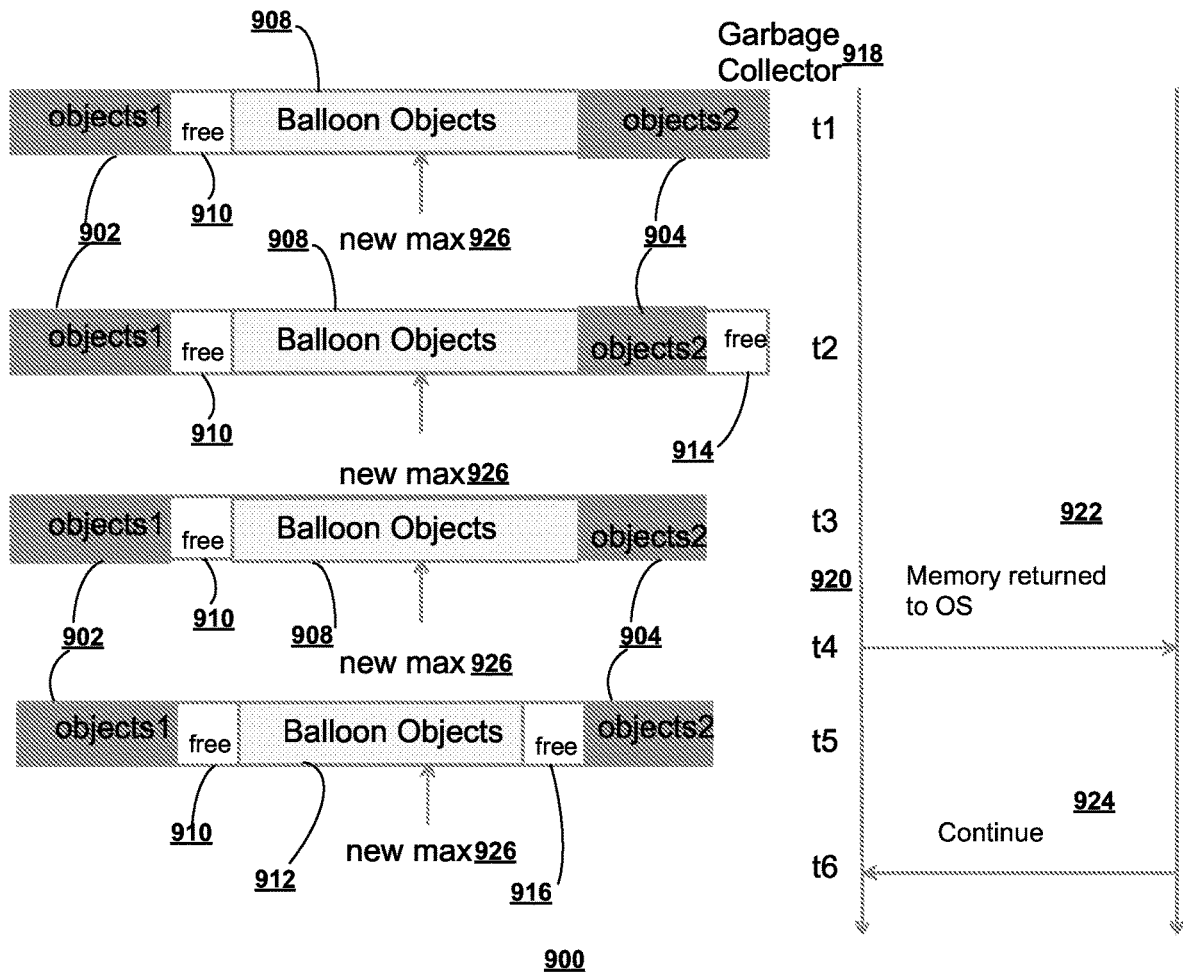
FIG. 9 is a block diagram of data structures in a garbage collection which does not move objects to free memory using a working set adjustment system of FIG. 3 in accordance with an embodiment of the disclosure.

With reference to FIG. 9 is a block diagram of data structures in a garbage collection which does not move objects to free memory using a working set adjustment system of FIG. 3 in accordance with an embodiment of the disclosure.

In the example, application activity may trigger garbage collections, which do not need to move objects, or the activity may simply free memory enabling the garbage collection to easily free memory back to the operating system. For example in a region based collector a region may become completely free. In this example process 900 adds a callback triggered by a return of memory back to the operating system by garbage collection 918 which includes the amount of memory freed and a handler for the callback notifying a memory manager which frees objects allocated by the balloon in an amount corresponding to the memory freed by the garbage collection.

The example uses a data structure representing allocations within heap memory comprising objects1 902, objects2 904, free space 910, 914 or balloon objects 908, 912 and new max 926. The data structure changes during processing are shown in relation to timeline 920 described in the following sections.

Using the timeline 920 containing times of t1 through t6, at t1 the balloon/heap size/dynamic target is in balance. At t2 either the application frees objects or garbage collection activity occurs such that the garbage collection can easily return memory to the operating system.

At t3 the garbage collection returns memory to the operating system (922). At t4 the garbage collection triggers the callback to inform the logic managing memory pressure.

At t5 the logic managing memory pressure frees balloon objects such that physical memory for heap−total balloon size=new max. At t6 the callback completes and the garbage collection proceeds as it would otherwise (924). Note that the objects1 902, objects2 904, free space 910, 914 or balloon objects 908, 912 are likely to be contiguous, but they are simply drawn that way to simplify. Balloon objects 908, are reduced in allocation to form balloon objects shown as balloon objects 912. In a similar manner free space 914 is reduced and shown as free space 916. New max 926 is maintained.

The disclosed method typically achieves a goal of using only an amount of physical memory set by a dynamic maximum while minimizing any additional processor or memory bandwidth resources required.

Figure 10:
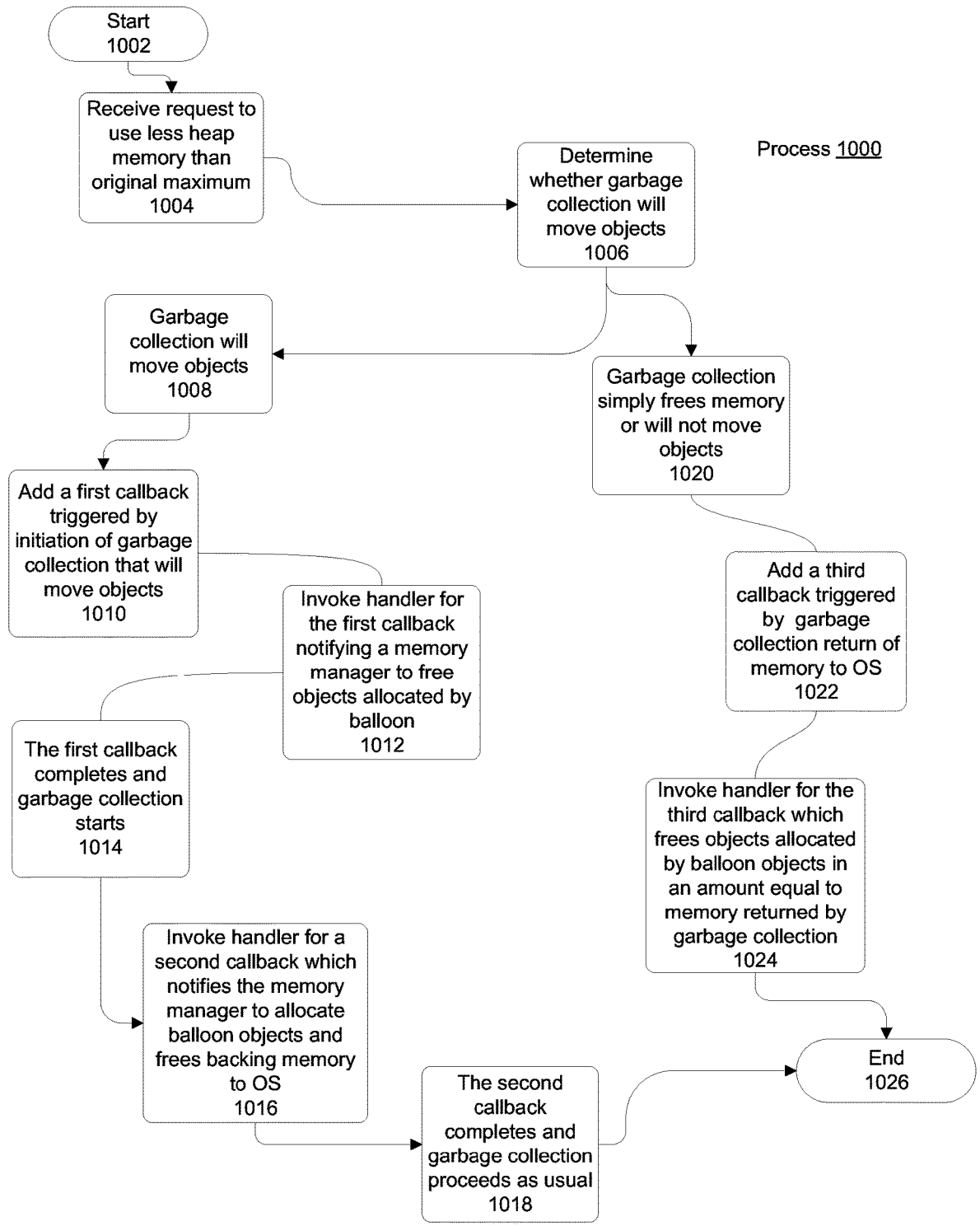
FIG. 10 is a flowchart of a process using garbage collection, using a working set adjustment system of FIG. 3 in accordance with an embodiment of the disclosure.

With reference to FIG. 10 a flowchart of a process using garbage collection, using a working set adjustment system of FIG. 3 in accordance with an embodiment of the disclosure is presented. Process 1000 is an example of a process using a garbage collection, using the working set adjustment system 116 of FIG. 3.

Process 1000 begins (step 1002) and receives a request to use less heap memory than an original maximum forming a new maximum (step 1004). Process 1000 determines whether a garbage collection will move objects in response to the request (step 1006).

Responsive to a determination the garbage collection will not move objects, process 1000 selects an execution path in which the garbage collection simply frees memory or will not move objects (step 1020). Process 1000 adds a third callback triggered by the garbage collection return of memory to the operating system (step 1022). Process 1000 invokes a handler for the third callback, which frees objects, allocated by balloon in an amount equal to the memory returned by the garbage collection (step 1024) and terminates thereafter (step 1026).

Responsive to a determination the garbage collection will move objects, process 1000 selects a execution path of garbage collection will move objects (step 1008). Process 1000 adds a first callback triggered by initiation of the garbage collection that will move objects (step 1010). Process 1000 invokes a handler for the first callback, notifying a memory manager to free objects allocated by balloon upon (step 1012). The first callback competes and garbage collection starts (step 1014).

Process 1000 invokes a handler for a second callback triggered by completion of garbage collection that may move objects which notifies the memory manager to allocate balloon objects and frees backing memory to the operating system (step 1016). The second callback completes and garbage collection proceeds as usual (step 1018) and process 1000 terminates thereafter (step 1026).

Alternative embodiments of the disclosed method might implement a version of garbage collection on a platform using madvise (DONT_NEED) or disclaim ( ) freeing memory for all regions of the heap not currently containing objects when a new target is set below current usage. However, overhead of the alternative on a per object/ allocation basis would typically be too expensive to be practical. Rather than using balloon objects, the disclosed method could also be implemented enabling the garbage collection to mark regions of the heap as not for use, and use madvise (DONT_NEED) on these regions to achieve a similar result.

Specific implementations as described in the disclosure with a division between the garbage collection and other logic to manage memory pressure is solely for descriptive purposes and the disclosed method is intended to cover any split/arrangement of the steps/actions disclosed such that regions of the heap are reserved to prevent use for object allocation wherein most of the memory for these regions is returned to the operating system and as the committed memory for the heap shrinks towards a new dynamic maximum, the reserved areas are adjusted in a equal amount.

As outlined earlier extensions include support for allowing balloon objects to be created in a specific way (for example, in the old space of a generational collector) and only freeing balloon objects which could be moved (for example, when a new space collect is not freeing previously allocated balloon objects in the old space).

Thus as presented in an illustrative embodiment, a computer-implemented method for working set adjustment receives a request to use less heap memory than an original maximum forming a new maximum, determines whether a garbage collection will move objects in response to the request. Responsive to a determination the garbage collection will simply free memory or not move objects, adds a third callback triggered by the garbage collection return of memory to the operating system. A handler is invoked for the third callback, which frees objects, allocated in balloon objects in an amount equal to the memory returned by the garbage collection.

Responsive to a determination the garbage collection will move objects, adds a first callback triggered by initiation of the garbage collection that will move objects. A handler for the first callback is invoked notifying a memory manager to free objects allocated by balloon. The first callback completes and garbage collection starts. A handler for a second callback is invoked which notifies the memory manager to allocate balloon objects and frees backing memory to the operating system.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method for working set adjustment, the computer-implemented method comprising:
   receiving a request to use less heap memory than an original maximum, forming a new maximum;
   determining whether a garbage collection will move objects in response to the request received;
   adding a first callback triggered by initiation of the garbage collection that will move objects, responsive to a determination that the garbage collection will move objects;
   invoking a handler for the first callback notifying a memory manager to free objects allocated by balloon;
   completing the first callback and starting the garbage collection;
   invoking a handler for a second callback which notifies the memory manager to allocate balloon objects and frees backing memory to an operating system, the balloon objects consuming an amount of memory space equal to a remaining portion of memory necessary to return to the operating system;
   completing the second call back allowing the garbage collection to proceed as usual;
   allocating a balloon object by determining a size of physical memory of the heap;
   determining whether the size of physical memory of the heap minus a total balloon size is greater than a new maximum;
   allocating a next balloon object, responsive to a determination that the size of physical memory of the heap minus a total balloon size is greater than a new maximum; and
   terminating cycle, responsive to a determination that the size of physical memory of the heap minus a total balloon size is not greater than a new maximum.

2. The computer-implemented method of claim 1, wherein determining whether a garbage collection will move objects in response to the request received further comprises:
   adding a third callback triggered by the garbage collection return of memory to the operating system, responsive to a determination that the garbage collection will simply free memory or not move objects; and
   invoking a handler for the third callback, which frees objects allocated by balloon objects in an amount equal to memory returned by the garbage collection.

3. The computer-implemented method of claim 1, wherein return of memory to the operating system comprises freeing memory backing the objects allocated by balloon so that physical memory for the heap minus total balloon size is equal to the new maximum.

4. The computer-implemented method of claim 1, wherein memory is returned to the operating system without rearranging the heap, responsive to a determination that the garbage collection will not move objects.

5. The computer-implemented method of claim 1, wherein specified regions of the heap are marked as reserved to prevent use for object allocation, wherein the specified regions of the heap marked as reserved are managed similar to balloon objects.

6. The computer-implemented method of claim 1, further comprising:
   allocating balloon objects in a specified location including one of new space and old space.

7. A computer program product for working set adjustment, the computer program product comprising:
   a computer readable; non-transitory storage device containing computer executable program code stored thereon, the computer executable program code comprising:
      computer executable program code for receiving a request to use less heap memory than an original maximum forming a new maximum;
      computer executable program code for determining whether a garbage collection will move objects in response to the request;
      computer executable program code for adding a first callback triggered by initiation of the garbage collection that will move objects, responsive to a determination that the garbage collection will move objects;
      computer executable program code for invoking a handler for the first callback notifying a memory manager to free objects allocated by balloon;
      computer executable program code for completing the first callback and starting the garbage collection;
      computer executable program code for invoking a handler for a second callback, which notifies the memory manager to allocate balloon objects, and frees backing memory to an operating system, the balloon objects consuming an amount of memory space equal to a remaining portion of memory necessary to return to the operating system;

computer executable program code for completing the second call back allowing the garbage collection to proceed as usual;

computer executable program code allocating a balloon object by determining a size of physical memory of the heap;

computer executable program code determining whether the size of physical memory of the heap minus a total balloon size is greater than a new maximum;

computer executable program code allocating a next balloon object, responsive to a determination that the size of physical memory of the heap minus a total balloon size is greater than a new maximum; and computer executable program code terminating cycle, responsive to a determination that the size of physical memory of the heap minus a total balloon size is not greater than a new maximum.

8. The computer program product of claim 7, wherein computer executable program code for determining whether a garbage collection will move objects in response to the request further comprises:

computer executable program code for adding a third callback triggered by the garbage collection return of memory to the operating system, responsive to a determination that the garbage collection will simply free memory or not move objects; and computer executable program code for invoking a handler for the third callback, which frees objects allocated by balloon objects in an amount equal to memory returned by the garbage collection.

9. The computer program product of claim 7, wherein computer executable program code for returning memory to the operating system comprises:

computer executable program code for freeing memory backing the objects allocated by balloon so that physical memory for the heap minus total balloon size is equal to the new maximum.

10. The computer program product of claim 7, wherein computer executable program code for adding a first callback triggered by initiation of the garbage collection that will move objects, responsive to a determination that the garbage collection will not move objects, further comprises:

computer executable program code for returning memory to the operating system without rearranging the heap.

11. The computer program product of claim 7, further comprising:

computer executable program code for specifying regions where the heap are marked as reserved to prevent use for object allocation, wherein the specified regions of the heap marked as reserved are managed similar to balloon objects.

12. The computer program product of claim 7, further comprising:

computer executable program code for allocating balloon objects in a specified location including one of new space and old space.

13. An apparatus for working set adjustment, the apparatus comprising:

a communications fabric;

a memory connected to the communications fabric, wherein the memory contains computer executable program code;

a communications unit connected to the communications fabric;

an input/output unit connected to the communications fabric;

a display connected to the communications fabric;

a processor unit connected to the communications fabric, wherein the processor unit executes the computer executable program code to direct the apparatus to:

receive a request to use less heap memory than an original maximum forming a new maximum;

determine whether a garbage collection will move objects in response to the request;

add a first callback triggered by initiation of the garbage collection that will move objects, responsive to a determination the garbage collection will move objects;

invoke a handler for the first callback notifying a memory manager to free objects allocated by balloon;

complete the first callback and starting the garbage collection;

invoke a handler for a second callback which notifies the memory manager to allocate balloon objects and frees backing memory to an operating system, the balloon objects consuming an amount of memory space equal to a remaining portion of memory necessary to return to the operating system;

complete the second call back allowing the garbage collection to proceed as usual;

allocating a balloon object by determining a size of physical memory of the heap;

determining whether the size of physical memory of the heap minus a total balloon size is greater than a new maximum;

allocating a next balloon object, responsive to a determination that the size of physical memory of the heap minus a total balloon size is greater than a new maximum; and terminating cycle, responsive to a determination that the size of physical memory of the heap minus a total balloon size is not greater than a new maximum.

14. The apparatus of claim 13, wherein the processor unit executes the computer executable program code to determine whether a garbage collection will move objects in response to the request further directs the apparatus to:

add a third callback triggered by the garbage collection return of memory to the operating system, responsive to a determination the garbage collection will simply free memory or not move objects; and invoke a handler for the third callback, which frees objects allocated by balloon objects in an amount equal to memory returned by the garbage collection.

15. The apparatus of claim 13, wherein the processor unit executes the computer executable program code to return memory to the operating system further directs the apparatus to:

free memory backing the objects allocated by balloon so that physical memory for the heap minus total balloon size is equal to the new maximum.

16. The apparatus of claim 13, wherein the processor unit executes the computer executable program code to further direct the apparatus to:

specify regions of the heap marked as reserved to prevent use for object allocation, wherein the specified regions of the heap marked as reserved are managed similar to balloon objects.

17. The apparatus of claim 13, wherein the processor unit executes the computer executable program code to further direct the apparatus to:

allocate balloon objects in a specified location including one of new space and old space.

* * * * *